United States Patent
Bekiarian et al.

(10) Patent No.: US 6,602,968 B1
(45) Date of Patent: Aug. 5, 2003

(54) FREE RADICAL POLYMERIZATION METHOD FOR FLUORINATED COPOLYMERS

(76) Inventors: Paul Gregory Bekiarian, 2621 Kimbrough Dr., Wilmington, DE (US) 19810; William Brown Farnham, 123 Dewberry Dr., Hockessin, DE (US) 19707

( * ) Notice: Subject to any disclaimer, the term of this patent is extended or adjusted under 35 U.S.C. 154(b) by 0 days.

(21) Appl. No.: 09/913,057

(22) PCT Filed: Mar. 2, 2000

(86) PCT No.: PCT/US00/05526
§ 371 (c)(1),
(2), (4) Date: Aug. 8, 2001

(87) PCT Pub. No.: WO00/52060
PCT Pub. Date: Sep. 8, 2000

Related U.S. Application Data

(60) Provisional application No. 60/122,354, filed on Mar. 2, 1999.

(51) Int. Cl.[7] ............................................. C08F 214/22
(52) U.S. Cl. .................. 526/255; 521/33; 526/208; 526/227; 526/243; 526/245; 526/247; 526/287; 526/292.1; 526/292.9
(58) Field of Search .................. 526/227, 287, 526/292.9, 255, 208, 243, 245, 247

(56) References Cited

U.S. PATENT DOCUMENTS

| 5,608,022 A |   | 3/1997 | Nakayama et al. |
| 6,025,092 A | * | 2/2000 | Doyle ........................ 429/213 |

FOREIGN PATENT DOCUMENTS

| JP | 62288617 | 12/1987 |
| WO | WO 94/03503 | 2/1994 |

\* cited by examiner

*Primary Examiner*—Fred Zitomer

(57) ABSTRACT

This invention concerns a process for production of copolymers, especially functionalized, or, at least partially fluorinated copolymers by means of a polymerization process comprising: co-polymerizing, in aqueous emulsion, one or more monomers selected from the group consisting of tetrafluoroethylene, trifluoroethylene, vinylidene fluoride, vinyl fluoride, ethylene, chorotrifluoroethylene, hexafluoropropylene, perfluoromethyl vinyl ether, and perfluoroethyl vinyl ether with a fluorinated co-monomer having limited water solubility, said comonomer being dispersed in the form of droplets of certain sizes.

5 Claims, 1 Drawing Sheet

FREE RADICAL POLYMERIZATION METHOD FOR FLUORINATED COPOLYMERS

This application claims benefit of application Ser. No. 60/122,354 filed Mar. 2, 1999.

FIELD OF THE INVENTION

This invention concerns a process for production of fluorinated copolymers by aqueous emulsion polymerization comprising pre-emulsifiying comonomers exhibiting low aqueous solubility. The process is especially useful for producing functionalized fluorinated, especially partially fluorinated, copolymers. It has been found that the copolymers produced herein have certain physical and mechanical properties which are advantageous in electrochemical applications such as batteries, fuel cells, electrolysis cells, ion exchange membranes, sensors, electrochemical capacitors, and modified electrodes, most particularly in lithium batteries and polymer electrolyte membrane fuel cells. Certain compositions of the invention are also useful as strong acid catalysts.

TECHNICAL BACKGROUND OF THE INVENTION

Functionalized polymers are useful in various technologies for generating desirable polymer characteristics. Some applications seek uniform distribution of comonomers for maximal product performance (see Quarderer, G.; Katti, S. S. Polymer Engineering and Science 1993, 33, 564). Other applications, as indicated in the following discussion, are thought to be best served by a combination of properties difficult to obtain from a single substance. For example a polymer suitable for use as an ionically conductive solid polymer electrolyte membrane must exhibit good affinity for suitable solvents and high conductivity while simultaneously exhibiting good mechanical integrity. The polymers produced in the process of the present invention are intended for use in electrochemical devices such as batteries, fuel cells, and electrochemical membrane reactors such as the membrane chlor-alkali process. In these applications, a solvent-swollen ion-exchange membrane separator is desired that can function as a free standing film with sufficient mechanical integrity to separate the electrodes and prevent short circuiting, puncturing, or excessive creep over a wide operating temperature range while under pressure. Polymers with suitable electrochemical properties often fall short in mechanical properties.

To improve mechanical properties of electrochemically preferred polymers, blends with inert fillers or, structural polymers are sometimes employed, as are crosslinking, and the use of fixed porous support membranes and the like. Such approaches often introduce new problems, and have not been found to be fully satisfactory. On the other hand many polymers which exhibit adequate mechanical toughness and strength, lack the needed electrochemical characteristics.

The vinylidene fluoride/lithium perfluorosulfonate ethoxy propyl vinyl ether (VF2/Li-PSEPVE) ionomers and related species disclosed in copending application Ser. No. 09/023,244, which are polymerized, though not hydrolyzed, according to the teachings of the art, address these requirements with only partial success. These polymers, when swollen with quantities of preferred solvents such as dipolar aprotic liquids, exhibit excellent ionic conductivity while retaining desirable mechanical properties and processability. However, the softening temperature of those solvent/ionomer compositions may constrain their application in certain high temperature end uses. The VF2 ionomers formed by the process of the present invention exhibit markedly higher melting or softening temperatures, than do those of similar composition in the art, both in their neat form and in combination with solvents.

It is known in the art that water uptake and ionic conductivity both increase with decreasing equivalent weight in Nafion® perfluorinated ionomer, the hydrolyzed copolymer of TFE and PSEPVE, available from DuPont.

In actual fact, ionic conductivity exhibits a maximum as a function of decreasing equivalent weight because excessive solvent uptake actually interferes with ionic conductivity. A polymer of low EW of reduced solvent uptake is highly desirable as an approach to achieving the desired mix of properties for electrochemical applications.

WO 9403503 A2 940217 assigned to Imperial Chemical Industries, Ltd. claim polymers of tetrafluoroethylene and sulfonyl fluoride containing perfluorovinyl ethers prepared by emulsion polymerization.

Nakayama, U.S. Pat. No. 5,608,022 discloses an aqueous emulsion copolymerization of tetrafluoroethylene (TFE) and a perfluorocarbon monomer containing a functional group, the latter being in the form of a fine dispersion having an average diameter of 2 micrometers or less, the polymerization being effected in the presence of a water-soluble organic chain transfer agent and a small amount of surfactant.

SUMMARY OF THE INVENTION

The present invention is a polymerization process for forming a copolymer comprising:

co-polymerizing in aqueous emulsion one or more monomers selected from the group consisting of tetrafluoroethylene, trifluoroethylene, vinylidene fluoride, vinyl fluoride, ethylene, chorotrifluoroethylene, hexafluoropropylene, hexafluoroisobutylene, perfluoromethyl vinyl ether, and perfluoroethyl vinyl ether with a fluorinated co-monomer having limited water solubility, said comonomer being dispersed in the form of droplets of a size of 10 microns or less, said polymerization process being conducted in the presence of a fluorinated surfactant and a free-radical initiator.

A preferred droplet size is 5 microns or less, and most preferred is 0.5 microns or less. Preferred co-monomers contain sulfonyl fluoride groups and are of the structure:

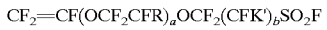

wherein R and R' are independently selected from F, Cl or a perfluoroalkyl group having 1 to 10 carbon atoms optionally substituted with one or more ether oxygens, a=0, 1 or 2, and b=0 to 6.

Another preferred co-monomer class contains carboxylic acid ester groups and is described by the structure:

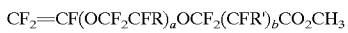

wherein R and R' are independently selected from F, Cl or a perfluoroalkyl group having 1 to 10 carbon atoms optionally substituted with one or more ether oxygens, a=0 or 2, and b=0 to 6.

Most preferred is (I) wherein a=1, R=CF$_3$, R' is F and b=1, known in the art as perfluoro-2-(2fluorosulfonyletoxy) propyl vinyl ether (CF$_2$=CF—O—CF$_2$—CF(CF$_3$)—O—CF$_2$—CF$_2$—SO$_2$F is herein abbreviated as PSEPVE).

DETAILED DISCUSSION OF THE INVENTION

Figure 1:
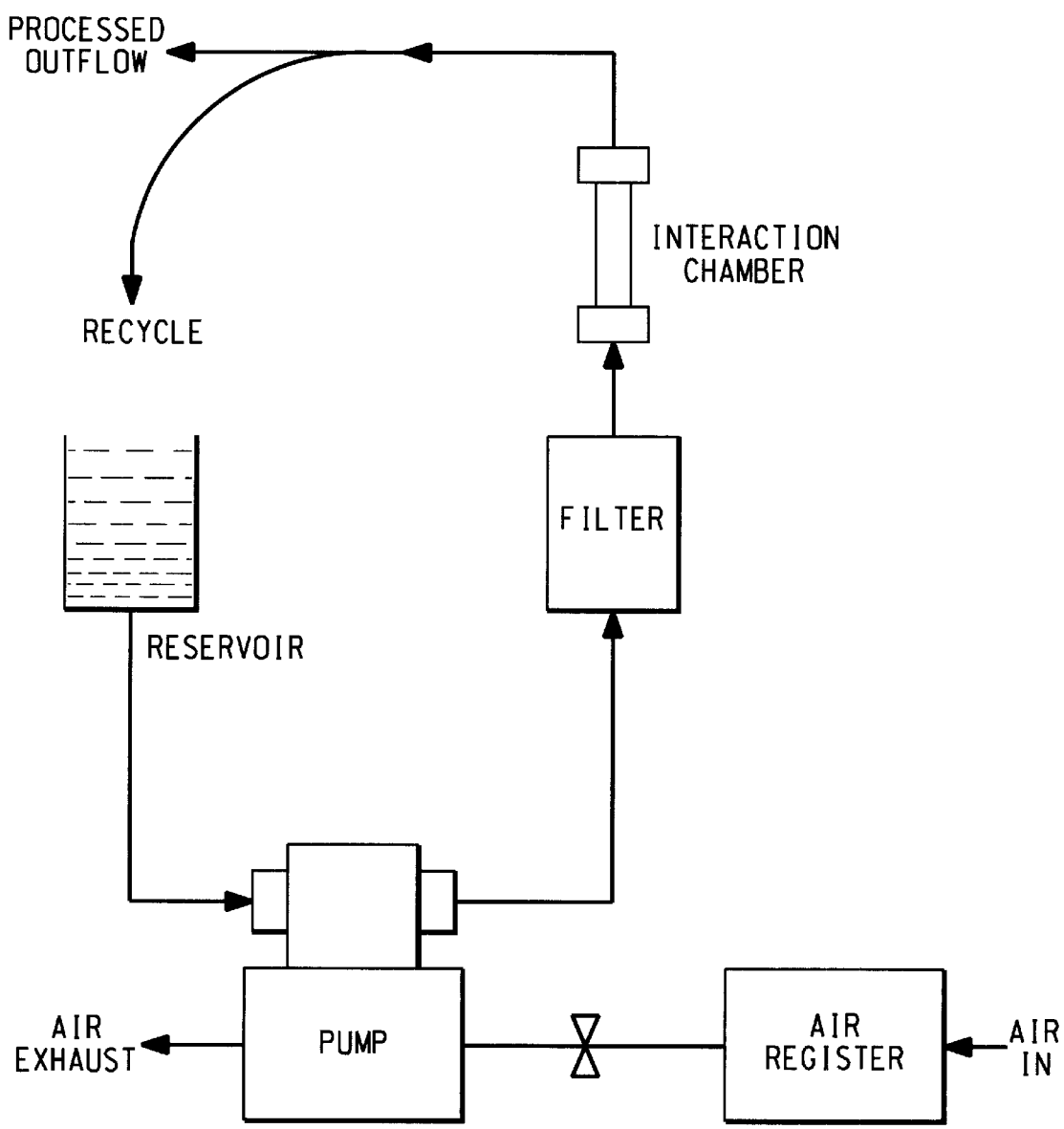
FIG. 1 is an apparatus for forming the emulsion.

The process of the invention exhibits several surprising attributes. It is particularly surprising that highly satisfactory and excellent-performing copolymer compositions are produced thereby without chain transfer agents. According to Nakyama,op.cit., polymerizanion without chain transfer agents is highly inhomogeneous, resulting in a blend of TFE homopolymer and copolymer. In the process of the present invention, TFE homopolymer is not formed to any significant degree.

It is a further surprising attribute that copolymers of $VF_2$ and the functionalized monomers suitable for the practice of the invention exhibit surprisingly high melting points. The preferred ionic derivatives of $VF_2$/PSEPVE copolymers disclosed in copending application Ser. No. 09/023,244 which are not polymerized according to the process herein disclosed, exhibit melting points 20–30 centigrade degrees lower than ionic derivatives of copolymers of comparable composition made by the process of the present invention.

Disclosed in copending application Ser. No. 09/023,244 is an alternative process for obtaining high melting point copolymer the process comprising polymerization of $VF_2$ with an ionic comonomer. However, polymerization of an ionic species is often problematical, and frequently not a practical route to the desired product.

A further alternative route to the high melting point polymer of the invention may be to effect copolymerization of the monomers in fluorinated solvents instead of water. Polymerization in fluorinated solvents is not a preferred route to the desired product because of the high costs of solvent and inconveniences in handling.

The process of the invention involves the copolymerization of a liquid, substantially water-insoluble functionalized fluorocarbon monomer with a gas phase comonomer in an aqueous polymerization medium. Such polymerizations are well known in the art, as described for example in Connolly et al. U.S. Pat. No. 3,282,875, In the process of the present invention there is added the step of first emulsifying the liquid monomer by combining it with water and a suitable surfactant under high shear mixing conditions, the result being to form a dispersion of fine droplets, typically of sub-micrometer size, of the monomer in the water. The dispersion so formed is then introduced into a suitable reaction vessel, typically a pressure vessel, in the presence of additional surfactant, more water, and the gaseous monomer.

In a typical reaction of the invention, after a suitable purging procedure the reaction vessel is pressurized with the gaseous monomer, the free radical initiator is introduced and the reaction occurs. Preferably the reaction medium is stirred throughout.

It is believed that in the process of the present invention, the very high surface area of the liquid monomer in the fine dispersion leads to much higher efficiency of incorporation into the copolymer, providing much improved utilization of the liquid comonomer, and superior control of the polymerization.

It is further believed, particularly in the preferred embodiment of the invention wherein VF2 is the gaseous monomer, that the process of the invention leads to the formation of polymer chains having liquid monomer-rich regions and liquid monomer-poor regions, the latter being essentially lengths of polyvinylidene fluoride (PVDF). The resulting greater perfection of crystallites formed by the PVDF regions provide improved mechanical properties, higher melting points and thereby higher use temperature, and, in the ionomer derived therefrom, limited solvent absorption. On the other hand, the high density of ionic groups in the liquid monomer-rich regions of the ionomer derivative are in effect low EW ionomers which provide high conductivity without concomitant excessive solvent uptake.

The particular means by which the liquid monomer is emulsified is not of particular significance, so long as the means employed results in a dispersion having an average droplet size of less than ca. 5 micrometers, preferably less than 0.5 micrometer. Methods such as are known in the art are fully suitable. Such methods include ultrasonic agitation, and jet dispersion in an eductor.

Preferred ranges of comonomer compositions are from 2 to 50 mole %, with 4 to 12 mole % most preferred.

A terpolymer may optionally be formed according to the process of the present invention by addition of a third monomer selected from the group consisting of tetrafluoroethylene, hexafluoropropylene, trifluoroethylene, vinylidene fluoride, vinyl fluoride, ethylene, or chorotrifluoroethylene, at any time during the polymerization process.

In a preferred embodiment of the invention, PSEPVE is emulsified by combining with water and a water-soluble fluorinated surfactant in a high shear mixer to form droplets of ca. 0.5 micrometers in size in water emulsion. Preferred water soluble fluorinated surfactants include ammonium perfluorooctanoate (C-8), ammonium perfluorononanoate (C-9), and $CF_3(CF_2)_5CH_2CH_2SO_3H$. Most preferred is C-8.

The PSEPVE is combined with water containing the surfactant at a concentration in the range of 14–50 g/liter, preferably 40–50 g/liter, the concentration of PSEPVE in the emulsion formed therewith being 10–500 g/liter, the preferred concentration being at the upper limit of operability.

A preferred apparatus for forming the emulsion is a Microfluidizer™ manufactured by Microfluidics, Inc., as shown in FIG. 1. Referring to the FIGURE, A reservoir feeds an air-driven liquid pump which in turn forces the fluids through an "interaction chamber" at 10–15 Kpsi. The stream is recycled through the apparatus until emulsification is complete. The high shear of this process produces heat so, although it is not shown in the schematic, the recycle line is coiled and runs through an ice/water cooling bath on its way back to the reservoir. The volume holdup in the apparatus is ~50 ml.

In the typical practice of the invention, mixing times of 5–20 minutes have been found to be satisfactory.

The dispersion formed by the process of the invention are metastable, and need to be used in the polymerization step before separation takes place. It is found in the practice of the invention that satisfactory results can be obtained when the dispersion is used in fewer than 5 days, preferably fewer than 3 days, most preferably fewer than 8 hours, from the time it is formed.

Emulsion Polymerizations of PSEPVE with other comonomers are preferably performed in a jacketed autoclave in which monomers and reagents can be continuously fed at controlled rates during the polymerization.

EXAMPLES

Example 1

The MicroFluidizer™ reservoir was charged with a solution of 10 g C-8 in 100 ml demineralized water. The pump was started and the fluids allowed to recycle to mix the surfactant solution with the 50 ml of pure demineralized water held up within the apparatus. PSEPVE (75 g) was added to the reservoir and the system allowed to recycle for 10 min to produce a well dispersed PSEPVE emulsion. The emulsion was translucent blue as it exited the MicroFluidizer™. Particle size analysis, at 25° C. using a 200 mw Argon-ion laser at 488 nm with 90 degree scattering angle, showed the average diameter of the freshly prepared PSEPVE emulsion droplets to be 238 nm. The emulsion aged to an opaque white over 6–8 hr. The white emulsion was generally stable for at least 5 days before settling was observed. After aging for 2 days, particle size analysis, at 25° C. using a 200 mw Argon-ion laser at 488 nm with 90 degree scattering angle, showed the average diameter of the aged PSEPVE emulsion droplets to be 331 nm. After aging for 16 days, particle size analysis, at 25° C. using a 200 mw Argon-ion laser at 488 nm with 90 degree scattering angle, showed the average diameter of the aged PSEPVE emulsion droplets to be 410 nm.

Example 2

The MicroFluidizer™ reservoir was charged with a solution of 22 g C-8 in 260 ml demineralized water. The pump was started and the fluids allowed to recycle to mix the surfactant solution with the 50 ml of pure demineralized water held up within the apparatus. PSEPVE (250 g) was added to the reservoir and the system allowed to recycle for 20 min to produce a well dispersed PSEPVE emulsion. The outflow was then directed to a 500 ml volumetric flask. After the reservoir was pumped down, 100 ml demineralized water was added and pumped through the system to flush the remaining PSEPVE emulsion through and bring the level in the volumetric flask up to the mark. The emulsion was translucent blue as it exited the MicroFluidizer™. The emulsion aged to an opaque white over 6–8 hr.

Example 3

A 4-L horizontal autoclave with mechanical agitator was purged with nitrogen and charged with pre-emulsified PSEPVE (150 g) in aqueous ammonium perfluorooctanoate (prepared using 35 g ammonium perfluorooctanoate and 600 mL water in the Microfluidizer™ according to the methods hereinabove described, then diluted to 1.0 liter with distilled water, and 1500 mL of distilled water. The reactor was evacuated, then pressured to 0 psig with vinylidene fluoride (3 times), heated to 60° C., pressured to 400 psig with vinylidene fluoride, and agitated at 200 rpm. A solution of aqueous potassium persulfate (0.6%, 50 mL) was added over a 5 min period. Reactor pressure was maintained at 400 psi until 220 g had been fed after initiator addition. Agitation was stopped and the reactor was cooled and vented. The resulting milky dispersion was frozen and thawed to coagulate the product which was filtered through nylon cloth and washed with water repeatedly to remove surfactant. After air drying, polymer crumb was dried in a nitrogen-purged vacuum oven at 100° C. for 24 hr to give 350 g of product. $_{19}$F NMR (acetone): +45.2 (s, a=1.00), −78.0 to −80.0 (m's, a=7.876), −90.0 to −95 (m's, a=21.343), −108 to −116 (series of m, a=6.446), −122.0 to −127.5 (m's, combined a=2.4296), −143.0 (bd s, a=1.283), consistent with mol % PSEPVE=9.1%. Within experimental error, all of the liquid comonomer charged to the reactor was accounted for in the collected product copolymer. TGA (10°/min, N2): no weight loss until 375° C. DSC (20°/min): maximum of broad melting transition at 159.1° C. (23.1 J/g); Tg=−23° C.

Example 4

Example 3 was repeated exactly, except operating at 300 psig pressure of vinylidene fluoride. There was obtained 357 g of product. $^{19}$F NMR revealed 9.5 mol % PSEPVE. DSC showed peak of broad melting transition at 160.8° C. (22.8 J/g), $T_g$=−21° C.

Example 5

A 4-L horizontal autoclave with mechanical agitator was purged with nitrogen and charged with pre-emulsified PSEPVE (150 g) in aqueous ammonium perfluorooctanoate (prepared using 35 g ammonium perfluorooctanoate and 600 mL water with a Microfluidizer™ obtained from Microfluidics, Inc., then diluted to 1.00 liter with distilled water), and 1500 mL of distilled water. The reactor was evacuated, then pressured to 0 psig with vinylidene fluoride (3 times), heated to 60° C., pressured to 300 psig with vinylidene fluoride, and agitated at 200 rpm. A solution of aqueous potassium persulfate (0.6%, 50 mL) was added over a 5 min period. Reactor pressure was maintained at 300 psi until 57 g had been fed after initiator addition. Agitation was stopped and the reactor was cooled and vented. The resulting milky dispersion was frozen and thawed to coagulate the product. The polymer sponge was washed with water, cut in small pieces, and processed in a blender with ice. The resulting polymer crumb was washed with water, air dried, then dried in a nitrogen-purged vacuum oven at 85° C. for 48 hr to give 210.5 g of product. $^{19}$F NMR (acetone): +44.0, 44.8 (overlapping s, a=0.94), −79.0 to −82.0 (m's, a=7.000), −91.5 to −97.5 (m's, a=4.611), −109 −117.5 (series of m, a=4.7399), −123.0 to −129 (m's, combined a=2.677), −145.4 (bd s, a=1.206); integration was consistent with mol % PSEPVE=25.3%.

Thus, 99% of the liquid comonomer charged to the reactor was accounted for in the collected product copolymer. TGA (10°/min, N2): no weight loss until 375° C. DSC (20°/min): maximum of broad melting transition at 126° C. (2 J/g); Tg=−23° C.

Example 6

A 4-L horizontal autoclave with mechanical agitator was purged with nitrogen and charged with pre-emulsified PSEPVE (150 g) in aqueous ammonium perfluorooctanoate (prepared using 35 g ammonium perfluorooctanoate and 600 mL water with a Microfluidizer™ obtained from Microfluidics, Inc., then diluted to 1.00 liter with distilled water), and 1500 mL of distilled water. The reactor was evacuated, then pressured to 0 psig with vinylidene fluoride (3 times), heated to 60° C., pressured to 300 psig with vinylidene fluoride, and agitated at 200 rpm. A solution of aqueous potassium persulfate (0.6%, 50 mL) was added over a 5 min period. Reactor pressure was maintained at 300 psi until 111 g had been fed after initiator addition. Agitation was stopped and the reactor was cooled and vented. The resulting milky dispersion was frozen and thawed to coagulate the product. The polymer sponge was washed with water, cut in small pieces, and processed in a blender with ice. The resulting polymer crumb was washed with water, air dried, then dried in a nitrogen-purged vacuum oven at 85° C. for 48 hr to give 254.3 g of product. $_{19}$F NMR (acetone): +44 (overlapping, a=0.943), −79.0 to −81.6 (m's, a=7.000), −90 to −97.5 (m's, a=8.3719), −109 to −119 (series of m, a=5.191), −123.0 to −129 (m's, combined a=2.5083), −145 (bd s, a=1.2446); integration was consistent with mol % PSEPVE=17.6%. Within experimental error, all of the liquid comonomer charged to the reactor was accounted for in the collected product copolymer. TGA (10°/min, N2): essentially no loss until 375° C., then major loss (96%).

DSC (20°/min): $2^{nd}$ heat; maximum of broad melting transition at 151.9° C. (8.0 J/g); Tg=−19.6° C.

Example 7

A 4-L horizontal stainless-steel stirred polymerization reactor was flushed with nitrogen and conditioned by charging with 2 liters demineralized water, 5 g ammonium persulfate, 5 g ammonium perfluorooctanoate, then agitating at 150 rpm while heating the vessel contents to 100° C./15 min. The vessel was cooled, the contents dumped to waste and the vessel rinsed 3 times with 2 liters demineralized water.

The reactor was charged with 1.75 liter demineralized water, 0.5 g sodium sulfite, and a 250 ml aqueous precharge containing 20 g emulsified PSEPVE and 7 g ammonium perfluorooctanoate. The reactor was sealed, pressured with nitrogen to 100 psi and vented (3 cycles). The reactor was evacuated to −14 psi and flushed with tetrafluoroethylene (TFE) to 0 psi (3 cycles). Agitation at 200 rpm was started and the reactor temperature was brought to 35° C. The reactor was pressurized with TFE to 50 psi at which time 8% ammonium persulfate and 8.8% sodium sulfite solutions were simultaneously pumped in at 1.5 ml/min each for 1 minute then continuously at 0.25 ml/min each. The polymerization initiated in 0.33 hr. TFE and a PSEPVE emulsion, containing 240 g PSEPVE and 21 g ammonium perfluorooctanoate per 500 ml, were fed as needed at an 85:15 mole ratio to maintain 50 psi reactor pressure. The polymerization was continued for 5.3 hr, feeding a total of 522.6 g TFE/PSEPVE for an overall rate of 98.4 g/hr. The run was terminated to yield a clear, water-white latex containing 19.2% polymer solids.

The polymer latex was frozen in dry ice, defrosted, frozen a second time and defrosted. The agglomerated polymer was clear and sticky. The polymer was washed vigorously 4 times in 5 gal hot (50° C.) tap water then washed a final time in 5 gal demineralized water (20° C.). After the first wash, the polymer was no longer sticky and had broken up into a fine white powder. The washed polymer was dried at 100° C./24 hr under nitrogen sparged partial vacuum to yield 388 g of fine white polymer powder. Thick films (0.025 in) pressed at 260° C. were exceptionally clear, clean and free of visible color. Analysis: %S =3.425 wt % (17 mole % PSEPVE; equivalent weight=934 da); melt index @270° C.=0.214 g/10 min (1,200 g weight); DSC was featureless with no readily identifiable transitions.

Example 8

A 4-L horizontal stainless-steel stirred polymerization reactor was flushed with nitrogen and conditioned by charging with 2 liters demineralized water, 5 g ammonium persulfate, 5 g ammonium perfluorooctanoate, then agitating at 150 rpm while heating the vessel contents to 100° C./15 min. The vessel was cooled, the contents dumped to waste and the vessel rinsed 3 times with 2 liters demineralized water.

The reactor was charged with 1.75 liter demineralized water, and 6 g ammonium perfluorooctanoate. The reactor was sealed, pressured with nitrogen to 100 psi and vented (3 cycles). The reactor was evacuated to −14 psi and flushed with tetrafluoroethylene (TFE) to 0 psi (3 cycles), at which time a 300 ml aqueous precharge, containing 150 g emulsified PSEPVE and 13.2 g ammonium perfluorooctanoate, was pumped in. Agitation at 200 rpm was started and the reactor temperature was brought to 60° C. The reactor was pressurized with TFE to 200 psi at which time 0.9 g potassium persulfate dissolved in 20 ml demineralized water was pumped in at a rate of 10 ml/min. The polymerization initiated in 0.06 hr. TFE was fed as needed to maintain 200 psi reactor pressure. The polymerization was continued for 1.23 hr, feeding a total of 203 g TFE for an overall rate of 165 g/hr. The run was terminated to yield a clear, water-white latex containing 16% polymer solids.

The polymer latex was frozen, and defrosted. The agglomerated polymer was washed vigorously 4 times in 5 gal hot (50° C.) tap water then washed a final time in 5 gal demineralized water (20° C.). After the final wash, the polymer was a fine white powder. The washed polymer was dried at 100° C./24 hr under nitrogen sparged partial vacuum to yield 320 g of fine white polymer powder. Thick films (0.025 in) pressed at 325° C. were exceptionally clear, clean and free of voids or visible color. Analysis: %S=2.775 wt % (12.4 mole % PSEPVE; equivalent weight=1156 da); DSC analysis: Tg=6° C.(I), Tm=234° C.

Comparative Example A

Copolymerization of PSEPVE (separate liquid phase) and $VF_2$ A 4-L horizontal autoclave with mechanical agitator was purged with nitrogen and charged with ammonium perfluorooctanoate (35 g) in 2.50 liters of distilled water and PSEPVE (150 g, added as neat liquid). The reactor was evacuated, then pressured to 0 psig with vinylidene fluoride (3 times), heated to 60° C., pressured to 300 psig with vinylidene fluoride, and agitated at 200 rpm. A solution of aqueous potassium persulfate (0.6%, 30 mL) was added over a 3 min period. Reactor pressure was maintained at 300 psi until 500 g had been fed after initiator addition. Agitation was stopped and the reactor was cooled and vented. The resulting milky dispersion was added to a separatory funnel and the liquid fluorocarbon phase was removed. The remaining polymer dispersion was frozen and thawed to coagulate the product which was filtered through nylon cloth and washed with water repeatedly to remove surfactant. After air drying, the polymer crumb was dried in a nitrogen-purged vacuum oven at 100° C. for 24 hr to give 577 g of product. $_{19}F$ NMR (acetone) was consistent with mol % PSEPVE= 2.1 %. Thus, only 75 g of the initially charged liquid comonomer was incorporated in the product. DSC (20°/min): maximum of broad melting transition at 157.8° C. (35.8 J/g).

Comparative Example B

Copolymerization of PSEPVE (Separate Liquid Phase) and $VF_2$

A 4-L horizontal autoclave with mechanical agitator was purged with nitrogen and charged with ammonium perfluorooctanoate (35 g) in 2.50 liters of distilled water and PSEPVE (150 g, added as neat liquid). The reactor was evacuated, then pressured to 0 psig with vinylidene fluoride (3 times), heated to 60° C., pressured to 300 psig with vinylidene fluoride, and agitated at 200 rpm. A solution of aqueous potassium persulfate (1.2%, 30 mL) was added over a 3 min period. Reactor pressure was maintained at 300 psi until 50 g had been fed after initiator addition. Agitation was stopped and the reactor was cooled and vented. The resulting milky dispersion was added to a separatory funnel and the liquid fluorocarbon phase was removed. The remaining polymer dispersion was frozen and thawed to coagulate the product which was filtered through Nylon cloth and washed with water repeatedly to remove surfactant. After air drying, the polymer crumb was dried in a nitrogen-purged vacuum oven at 100° C for 24 hr to give 86.6 g of product. $_{19}F$ NMR data (acetone) was consistent with mol % PSEPVE=6.6%. Thus, only 28.6 g of the initially charged liquid comonomer was incorporated in the product. DSC (20°/min): maximum of broad melting transition at 133.7° C. (17.9 J/g).

Example 9

Swelling and Conductivity of Compositionally Heterogeneous TFE/PSEPVE Copolymer The polymer of Example 8 was melt pressed into a film using a Carver Hot Press at 320° C. and 5 klbs pressure. The film obtained was clear and uniform and 2.5 to 3.5 mils in thickness. This film was immersed into a 0.5 M solution of LiOH in 1:2 DMSO:$H_2O$ contained in a glass beaker on a hot plate and held at T=70° C. for four hours. Following the hydrolysis, the membrane was rinsed with deionized water using T=90° C. immersion for 2 hours. Acid exchange was carried out by immersing in 1.0 M nitric acid at room temperature for 1 hour followed by rinsing in deionized water at T=90° C. for 2 hours.

The membrane so-obtained was found to absorb 15 weight percent of liquid water based on the total weight of the swollen polymer. The ionic conductivity of the acid-form membrane at 23° C. was equal to 65 mS/cm. This ionic conductivity is higher than that achieved with a TFE/PSEPVE copolymer known in the art containing a similar weight percent of water as shown in Comparative Example C below.

Comparative Example C

Swelling and Ionic Conductivity for TFE/PSEPVE Copolymers Having Various EWs Made Using the Traditional Process Copolymers of TFE and PSEPVE having various equivalent weights were synthesized using the procedures known in the art and melt pressed into films using known procedures.

Membrane samples were hydrolyzed using 0.5 M LiOH in 1:1 DMSO/H2O by immersion into stirred solution at T=60° C. for two hours, followed by rinsing with DI water for 2 hours at T=90° C. For the lower EW membranes (EW<900), a 1:3 DMSO/$H_2O$ solution was used for hydrolysis to reduce swelling. Membranes are acid exchanged using 1.0 M nitric acid at RT for 1 hour followed by the same 2 hour rinse procedure at T=90° C. in DI $H_2O$.

Swelling and conductivity measurements are performed as follows. Samples of various EW membranes 1.0 by 1.5 $cm^2$ in size are first dried for 48 hours at T=120° C. in vacuum. These are then immersed into a glass vial containing DI $H_2O$ and allowed to swell for 2 hours. The final weight and thickness of the swollen membrane is measured. Then, the membrane samples are assembled into the four-point-probe conductivity cell and ionic conductivity is measured. Ionic conductivities are given in Table 1 below as a function of EW for the acid-form membranes. Also given in this table are the weight % uptake of water by the various membranes. These TFE/PSEPVE copolymer membranes exhibit a maximum in conductivity at an EW of 980 grams/equivalent. This maximum is also coincident with the maximum in effective ion concentration in the membrane, found by dividing membrane density with equivalent weight where density is calculated for the water swollen membrane from the approximate relation: density $(g/cm^3)$=2.0−(wt % water uptake)/100.

TABLE 1

Ionic conductivity, water swelling weight %, and effective ionic concentration of various TFE/PSEPVE copolymers made using synthetic processes known in the art

| Equivalent weight (grams/equiv.) | Water uptake (weight %) | Effective ion concentration | Ionic Conductivity (S/cm) at 23° C. when swollen |
|---|---|---|---|
| 1500 | 13.3 | 1.245 | 0.0123 |
| 1350 | 19.4 | 1.338 | 0.0253 |
| 1200 | 21.0 | 1.492 | 0.0636 |
| 1100 | 25.0 | 1.591 | 0.0902 |
| 980 | 27.1 | 1.764 | 0.1193 |
| 834 | 53.1 | 1.761 | 0.1152 |
| 785 | 79.2 | 1.539 | 0.0791 |

Comparative Example D

Swelling and Conductivity of VF2/PSEPVE "Random" Copolymer Having Low EW

A 1-liter vertical stirred autoclave was charged with 500 mL of an aqueous solution of ammonium perfluorooctanoate (7 g) and PSEPVE (50.0 g, 0.112 mol). The vessel was closed, twice pressured to 100 psi nitrogen and vented, cooled to about 5° C. and evacuated. Vinylidene fluoride (50.0 g, 0.78 mol) was added, and the stirred (750 rpm) contents were heated to 600. A solution of potassium persulfate (0.40 g in 20 mL) was added over a 20 minute interval. Pressure decreased from 400 psi to 5 psi within 2 hours. The polymer was isolated by freeze/thaw coagulation. After washing with distilled water several times, the polymer sponge was cut in several pieces, frozen in liquid nitrogen, added to a blender to produce a polymer crumb which was washed with additional portions of water. There was obtained 95.5 g of white polymer after drying. DSC (20°/min, $N_2$, $2^{nd}$ heat) exhibited the maximum of a broad melting transition at 125° C. (8.7 J/g). TGA (10°/min, $N_2$) showed the onset of weight loss at ca. 250° C., with ca. 1% loss up to ca. 370° C. $^1$H NMR (THF-d8): 3.3–2.9 (lower field shoulders), 2.9–2.7 (major multiplet), 2.6 and 2.3 (minor multiplets). $^{19}$F NMR (THF-d8) featured signals at +45.4 ($FSO_2$), −78 to −80 (m's, $OCF_2$ and $CF_3$), −90 to −95 (m, $CH_2CF_2$), −110 to −123 (series of m, for minor $CH_2CF_2$ and $CF_2S$), −144 (CF).

A 8.9 g sample of the above PSEPVE/VF2 copolymer (ca. 10 m equivalents of pendant sulfonyl fluoride) was treated with methanol (50 mL) and lithium carbonate (0.81 g, 11 m equivalents $CO_3$) and stirred at 25°. After 3 hr, another 50 mL methanol was added and the mixture was stirred for 18 hr. The mixture was filtered through glass fiber paper. A portion of the methanol solution was used to cast films for conductivity testing and the remainder was evaporated to dryness under reduced pressure. $^{19}$F NMR (THF-d8) showed only a trace signal for residual $FSO_2$ moieties (>99% conversion), major signals at −76 to −82, −90.6, −93.1 and −95.3, −108 to −112 and series of m's at −113.6, −115.9, −117.5, −122 to −124, and −144 to −145 with integration in accord with 13 mol % incorporated lithium sulfonate form of PSEPVE.

A sample of the above ionomer was dried for a period of 48 hours in a vacuum oven at T=100° C. This membrane has approximately 13 mole % PSEPVE corresponding to an equivalent weight of 878 g/eq.

The dried membrane was transferred to a sealed container and conveyed to a glove box having a positive pressure of dry nitrogen applied thereto, wherein the membrane was removed from the sealed container and allowed to come to room temperature. The membrane was then cut into several sections 1.0 cm by 1.5 cm in size.

Immersion of a sample of this membrane directly into an excess of propylene carbonate (99%, Aldrich Chemical Co., Inc., Milwaukee, Wis.) contained within a glass vial brought about substantial swelling leading to a gel solution rather than a free-standing film. Solvent uptake is estimated at in excess of 1000% after complete immersion in an excess of solvent. This procedure results in a solvent-swollen gel that is not usable as a free-standing membrane for the desired applications.

Using a micropipette, 20 microliters of propylene carbonate was added to the surface of a membrane sample while at room temperature. The membrane was assembled into the four-point-probe conductivity cell and its conductivity measured after 10 minutes. Conductivity was $3.74 \times 10^{-4}$ S/cm. The weight uptake of PC was 89%. The membrane sample when swollen was tacky and stuck to PTFE surfaces and could no longer be handled as a free-standing film. Poor quality films were obtained when swollen with nearly equal weight or greater of solvent in the polymer.

Example 10

Swelling and Conductivity of Compositionally Heterogeneous VF2/PSEPVE Copolymer Having Low EW A sample of VF2/PSEPVE copolymer was synthesized according to the procedure of Example 3. It was converted to the lithium sulfonate form according to procedures described in co-pending application CL-1356-P1. This membrane has approximately 11.1 mole % PSEPVE corresponding to an equivalent weight of 963 g/eq.

A sample of this polymer crumb was mixed with propylene carbonate in a ratio of 2.5 grams PC to 1.0 gram polymer and heated in a sealed glass vial on a hot plate inside a nitrogen purged glove box. A clear gel was obtained by heating to 100° C. for several hours with occasional stirring with a spatula. A portion of this gel was hot pressed at 130° C. with minimal pressure to give a thin clear film 5 to 6 mils in thickness. Several pieces of this membrane of 1.0 cm by 1.5 cm in size were cut with a knife for conductivity testing. This membrane gave free-standing films that could be handled without difficulty. Conductivity was measured to be $3.81 \times 10^{-4}$ S/cm.

Immersion of a sample of this membrane directly into an excess of a 1:1 mixture of ethylene carbonate (Selectipur, EM Industries) and propylene carbonate contained within a glass vial brought about substantial swelling leading to an uptake of approximately 750%. However, the film was still free-standing and could be handled without difficulty and conductivity was equal to $7.91 \times 10^{-4}$ S/cm.

What is claimed is:

1. A process for forming a copolymer comprising, co-polymerizing, in aqueous emulsion vinylidene fluoride, with a functionalized fluorinated comonomer comprising sulfonyl fluoride or carboxylic acid ester groups, said comonomer being substantially insoluble in water and being dispersed in the form of droplets of a size of 0.5 microns or less, said polymerization process being conducted in the presence of a fluorinated surfactant and a free-radical initiator.

2. The process of claim 1 wherein the comonomer is perfluoro-2-(2-fluorosulfonylethoxy)propyl vinyl ether.

3. The process of claim 1 wherein the copolymer is subsequently melt processed into a film or sheet form.

4. The process of claim 1 wherein the copolymer is subsequently hydrolyzed using a basic solution to provide the alkali metal cationic form of the ionomer.

5. A copolymer made by the process of claim 1.

* * * * *